(12) United States Patent
Landman et al.

(10) Patent No.: US 7,249,357 B2
(45) Date of Patent: Jul. 24, 2007

(54) TRANSPARENT DISTRIBUTION AND EXECUTION OF DATA IN A MULTIPROCESSOR ENVIRONMENT

(75) Inventors: Joseph I. Landman, Canton, MI (US); Haruna Nakamura Cofer, Columbus, OH (US); Roberto Gomperts, Pepperell, MA (US); Dmitri Mikhailov, Newton, MA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 645 days.

(21) Appl. No.: 09/934,443

(22) Filed: Aug. 20, 2001
(Under 37 CFR 1.47)

(65) Prior Publication Data
US 2003/0036809 A1 Feb. 20, 2003

(51) Int. Cl.
*G06F 9/44* (2006.01)
(52) U.S. Cl. .......................................... 718/102; 712/28
(58) Field of Classification Search ........ 718/100–108; 707/1; 709/200–203; 712/1–300; 717/100–178
See application file for complete search history.

(56) References Cited

U.S. PATENT DOCUMENTS

| 5,127,104 | A | * | 6/1992 | Dennis | 712/201 |
|---|---|---|---|---|---|
| 5,506,984 | A | * | 4/1996 | Miller | 707/10 |
| 5,744,741 | A | * | 4/1998 | Nakajima et al. | 84/622 |
| 5,768,594 | A | * | 6/1998 | Blelloch et al. | 717/149 |
| 5,819,021 | A | * | 10/1998 | Stanfill et al. | 714/15 |
| 5,826,095 | A | * | 10/1998 | Jordan | 712/11 |
| 5,964,829 | A | * | 10/1999 | Ozden et al. | 718/102 |
| 6,185,590 | B1 | * | 2/2001 | Klein | 715/526 |
| 6,356,928 | B1 | * | 3/2002 | Rochkind | 718/101 |
| 6,415,286 | B1 | * | 7/2002 | Passera et al. | 707/6 |
| 6,434,590 | B1 | * | 8/2002 | Blelloch et al. | 718/102 |
| 6,480,876 | B2 | * | 11/2002 | Rehg et al. | 718/100 |
| 6,633,889 | B2 | * | 10/2003 | Dessloch et al. | 707/103 Y |
| 6,675,189 | B2 | * | 1/2004 | Rehg et al. | 718/100 |
| 6,901,409 | B2 | * | 5/2005 | Dessloch et al. | 707/103 Y |
| 2002/0035556 | A1 | * | 3/2002 | Shah et al. | 707/1 |

OTHER PUBLICATIONS

"Articles of Incorporation", dixtributed.net. (1997),4 pages.
"MSC.Nastran, Configuration and Operations Guide, Version 70.7" *MSC Software Corporation*, (1999),pp. 144-149.
"Project Information", SETI@home, (2002),2 pages.
"SGI and Incyte Deploy Linux Solution for Bioinformatics at Bristo-Myers Squibb", *SGI Global Services*, (2000),2 pages.
"The BIOpolymer Markup Language (BIOML)", *BIOML*, (1999),2 pages.

(Continued)

*Primary Examiner*—Lewis A. Bullock, Jr.
(74) *Attorney, Agent, or Firm*—Schwegman, Lundberg, Woessner & Kluth, P.A.

(57) ABSTRACT

Apparatus, methods, data structures, and systems are provided for subdividing input data associated with a first software program into job quanta, wherein each job quantum is operable to be executed by a separate software program residing on a different processing element from the first software program. The first software program and the separate software program execute substantially in parallel and output data associated with the executions of the programs are assembled into a single coherent presentation or results data. Moreover, the software programs may be threaded or non-threaded.

30 Claims, 6 Drawing Sheets

OTHER PUBLICATIONS

Abate, T.., "Biologists, Engineers Teaming up to Unravel Genomic Tread DNA sequencing instruments envolved in Silicon Valley", *San Francisco Chronicle*, (2000),4 pages.

Camp, N.., et al. ,"High-Throughput BLAST", *SGI*, (1998),8 pages.

Cover, R..,"Bioinformatic Sequence Markup Language (BSML)", *The XML Cover Pages*, (2001),2 pages.

Dharsee, M.., et al. ,"Modular Bioinformatics Distributed Computing Kernal", *MoBiDiCK*, (1999),2 page.

Glerum, K..,"Farming, Linux-Style", LinuxWorld.com, (2002),3 pages.

Glerum, K..,"Linux Farms for Mommies", midwinter.com, (2002),2 pages.

Gordon, P..,"XML for Molecular Biology", maggie,cbr.nrc.ca/-gordonp/xm,(2002),5 pages.

Jones, M..,"SGI, Incytel Install Linux System at Bristol-Meyrs Squibb", *Genome Web LLC*, (2000),3 pages.

\* cited by examiner

TRANSPARENT DISTRIBUTION AND EXECUTION OF DATA IN A MULTIPROCESSOR ENVIRONMENT

FIELD OF THE INVENTION

This invention relates generally to computer parallel processing, and more particularly to apparatus, methods, data structures, and systems for subdividing input data provided to a software program and transparently distributing the subdivided pieces to one or more additional programs executing in parallel to the software program.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright 2001, Silicon Graphics Incorporated, All Rights Reserved.

BACKGROUND OF THE INVENTION

Parallel processing provides economic, scalable, and high-availability approaches to computing solutions. From the point of view of using a computationally expensive non-threaded (e.g., single-threaded) legacy software program, there is a need for achieving the operational performance associated with parallel-processing techniques without substantially rewriting the legacy software program. In this way, the operational latency associated with the execution of the software program may be substantially reduced.

Parallel processing includes solutions that are largely hardware in nature such as, and by way of example only, massive parallel processing (MPP). Furthermore, parallel processing may be achieved in a multiple processing environment (MPE) using largely software techniques such as, and by way of example only, symmetric multiple processing (SMP) environments where a software job scheduler directs application programs to run on a particular processing element (PE). In SMP environments, the operating system (OS) is enabled to treat a group of PEs as peers.

Conventional parallel processing systems fall generally into four categories: single instruction stream operating on multiple data streams (SIMD), same program operating on multiple data streams (SPMD), multiple instruction streams operating on multiple data streams (MIMD), and multiple processors sharing a single data or memory (MISD). Moreover, a system that is usually not classified as a parallel processing system is often referred to as a single processor operating on single data (SISD).

Additionally, software programs may be written such that they are threaded, or capable of having their internal instructions concurrently (e.g., in parallel) executed multiple times by multiple processes. As will be apparent to those skilled in the art, developing a threaded program is an expensive development exercise, wherein the logic is largely event driven, rather than linear. Moreover, expensive error-handling applications must be developed for recovery purposes in the event of an unexpected failure during any particular execution sequence. As a result, very few legacy programs have been written in a threaded manner. For the most part, OS kernel programs are threaded as well as large-scale distributed database programs. A program that is not threaded is often referred to as being singly threaded or non-threaded.

In recent years, industry consortiums have promulgated industry standards that have increased the potential for achieving parallel processing results by creating a message-passing interface (MPI). By and large, MPI is primarily used to interface disparate software programs. In MPI, both the sending program and the receiving program must be capable of translating the MPI data. MPI is not a software program and legacy programs or additional programs must be developed to effectively process MPI data.

With MPI, input and output data passed among multiple programs are standardized, such that disparate computing environments or programs may be interfaced to one another. Yet, each interfaced program must be capable of translating the MPI data, therefore program customization is still required. Furthermore, MPI has not been embraced, or interfaced to, standard job scheduling programs that reside in MPEs. These job schedulers provide efficient load balancing to the PEs and, in some instances, individual programs residing on a single PE.

However, even with MPP, SMP, SIMD, SPMD, MIMD, MISD, and MPI many computationally expensive legacy programs are still unable to improve throughput of operation, because of the extreme development expense associated with rewriting the legacy programs to be threaded. For example, consider bioinformatic programs designed to compare protein or DNA sequences and query multiple databases for matches to multiple protein or DNA sequences. These programs continue to experience large operational latency, and none of the present technologies have provided cost-effective and timely solutions.

Accordingly, there is a need to transparently permit computationally expensive legacy programs to execute in parallel in order to improve operational efficiency, and there is a need to minimize the development expense associated with achieving the same. Therefore, there is a need for improved apparatus, methods, data structures, and systems which transparently parallel process the operations associated with a computationally expensive non-threaded software program.

SUMMARY OF THE INVENTION

The present invention provides solutions to the above-described shortcomings in conventional approaches, as well as other advantages apparent from the description, drawings, and claims included herein.

The present invention provides an apparatus for subdividing input data associated with a software program and processing each subdivided input data on one or more processing elements. The apparatus includes an initiating program, one or more processing programs, and a wrapper that intercepts a call to the initiating program which is further operable to subdivide the input parameters into one or more job quanta, wherein each job quantum is submitted for execution to a separate processing program selected from the one or more processing programs residing on a separate processing element.

In another aspect of the present invention, a method for processing a first non-threaded set of executable instructions is provided, wherein input data associated with a call to the first non-threaded set of executable instructions is received.

The input data is parsed into a plurality of job quanta, each job quantum operable to be independently processed by the non-threaded set of executable instructions. Additionally, at least one job quantum is submitted for execution to a second set of executable instructions that is substantially identical to the first non-threaded set of executable instructions. The second set of executable instructions resides on one or more different processing elements from the first non-threaded set of executable instructions.

In still another aspect of the present invention, a job quanta data structure is provided having a first data subset and a second data subset. The first and second data subsets are operable to be delineated from one another and are independently submitted as input parameter data used for execution by separate non-threaded sets of executable instructions and processed substantially in parallel.

In yet another aspect of the present invention, a system for performing parallel processing on a call to execute a software program is provided. The system includes an apparatus for intercepting a call to a software program, an apparatus for dividing an input data into a plurality of job quanta, and an apparatus for submitting at least one job quanta to the software program and for submitting at least one different job quantum to a separate software program. Finally, an apparatus for executing the software program and at least one of the separate software programs substantially in parallel is provided.

In another aspect, a method of processing a software program is provided wherein input data associated with a call to the software program is received. The input data is parsed into a plurality of job quanta, each job quantum operable to be independently processed by the software program. Next, at least one job quantum is submitted for execution to a replica software program that is substantially identical to the software program, wherein the replica software program resides on one or more different processing elements from the software program.

In still another aspect, an information handling system is provided including a network, a plurality of processing elements, a memory operatively coupled to the processing elements and an apparatus for wrapping a call to an application program. The apparatus divides input data among the processing elements for execution according to the application program and recombines output data from the processing elements.

DETAILED DESCRIPTION OF THE INVENTION

Figure 1:
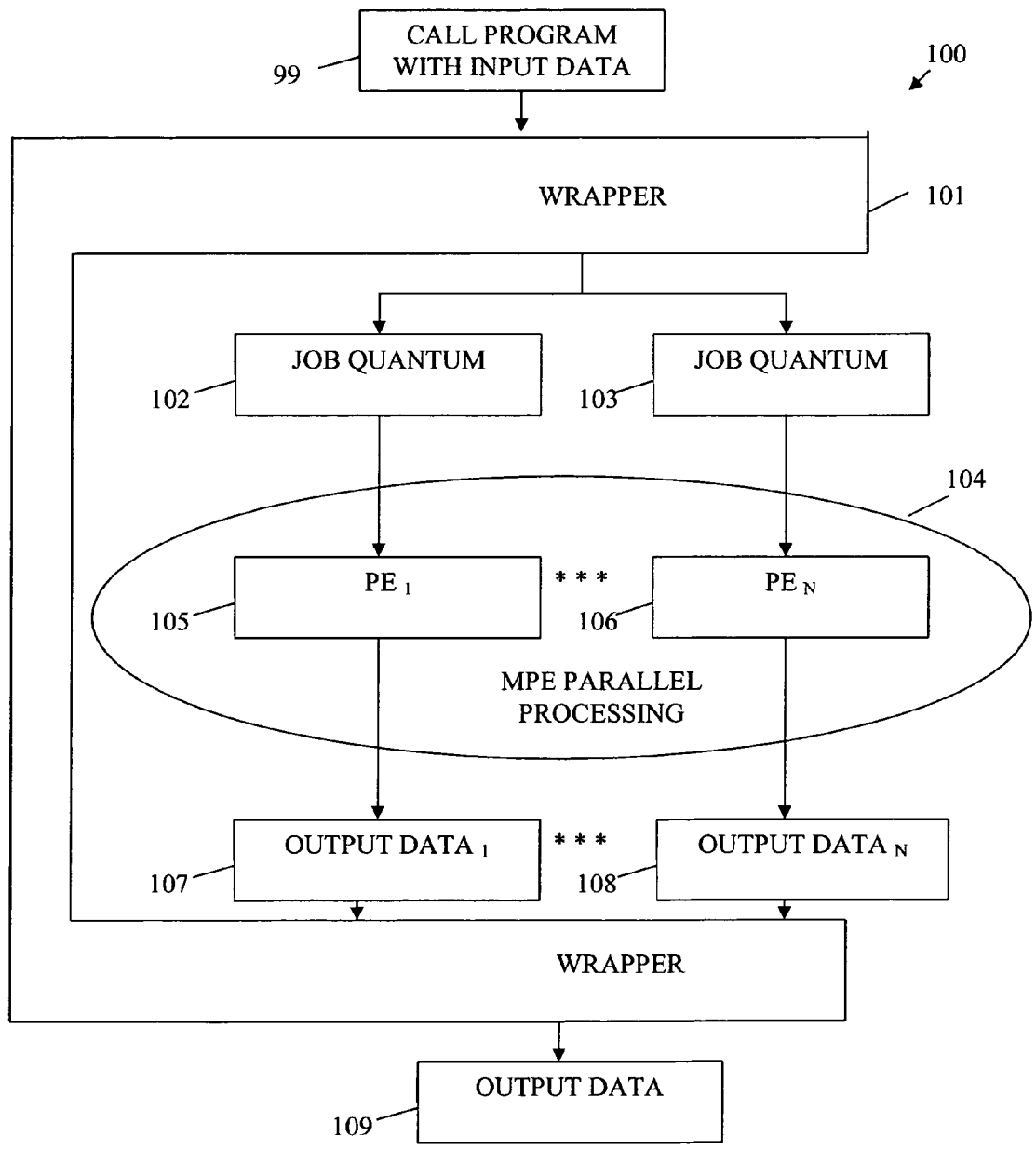
FIG. 1 shows a flow diagram for an operational embodiment of the present invention.

In the following detailed description of the preferred embodiments, reference is made to the accompanying drawings, which form a part hereof, and in which is shown by way of illustration specific embodiments in which the invention may be practiced. It is to be understood that other embodiments may be utilized and structural changes may be made without departing from the scope of the present invention.

One embodiment of the present invention operates in an MPE (multiple processing environment) having a wrapper software script, written in the PERL programming language that executes in a Linux OS environment. The wrapper intercepts calls made to a bioinformatic software program called BLAST and written in the C programming language. Each PE in the MPE has a copy or version of BLAST executing thereon. Of course other, computing environments, operating systems, programming languages, and software applications, now known or hereafter developed, may be readily employed without departing from the present invention.

A processing element (PE) may be, for example, a single computer, a cluster of coupled computers, or one of several tasks, each task being run in a multitasking environment on a single computer.

BLAST conducts rapid similarity searches on protein and/or nucleotide (i.e., nitrogen-containing molecules which link together to form strands of DNA and RNA) sequences residing on a plurality of distributed databases. Moreover, pattern matching for protein or DNA sequences may be performed. A single call to BLAST may include multiple computationally expensive searching and pattern-matching operations.

The PERL wrapper intercepts an initial call to BLAST and parses the input data into job quanta, wherein each job quantum includes input data necessary to perform a specific operation with the BLAST program. The wrapper then identifies which PEs that has a copy of BLAST executing thereon and submits a single job quantum to the identified BLAST program. Further, the wrapper receives output data associated with the execution of each BLAST software program and assembles the data into a single output data for presentation to the original calling software program, which intended to execute a single BLAST program.

As one skilled in the art will readily appreciate, the wrapper combined with multiple images of the BLAST software program, executing on multiple PEs, provides the ability to achieve parallel processing on the BLAST software program without the need for BLAST to be threaded. In other words, a computationally expensive bioinformatic legacy software program is transparently converted into a threaded software program, and operational throughput substantially improved thereby. In the burgeoning field of biochemistry, improving throughput of existing software programs is tremendously beneficial. Of course, any legacy software program that is computationally expensive would benefit from the present invention, such as programs designed to perform Cepstrum string analysis, Fast Fourier Transformations (FFTs), video manipulations, and the like.

FIG. 1 shows a flow diagram 100 for an operational embodiment of the present invention. A wrapper 101 intercepts the call to an initial program 99. The initial program may be any software program threaded or non-threaded. Next, the wrapper 101 subdivides the input data into multiple job quanta (102 and 103). Each job quantum (102 or 103) is submitted for execution to separate PEs (105 and 106). The initial program resides as a replica or substantial replica on each of the separate PEs (105 and 105). The PEs are networked together in an MPE 104, and correspondingly the execution of the initial program and replica program occurs in parallel. The initial program produces output data 107 and the replica program produces an output data 108, these data are collected by the wrapper 101 and assembled into a single output data 109.

Job quanta as referred to herein include data necessary to perform one or more operations within the same software program. Typically this may be referred to as input or parameter data. Moreover, in some embodiments, job quanta include file names, wherein the file itself includes the data necessary for operations of the software program. Further, in some embodiments, job quanta include data associated with performing the same operation within a software program repetitively.

For example, consider an operation that adds two matrices A and B having an order of 2, generating a third matrix C. In this example, the job quanta include the values for the matrices and an indication that an add operation is desired. Here the job quanta desires the execution of an add operation with 4 independent iterations, namely:

1: A11+B11=C11;
2: A12+B12=C12;
3: A21+B21=C21; and
4: A22+B22=C22.

Prior to submitting the job quanta for execution to an add operation, each data string associated with the independent execution of the add operation is subdivided into a job quantum, such that a job quantum 1 may appear as follows: "0,-1" where "0" represents the value of the A11 cell within the A matrix, and "-1" represents the value of the B11 cell within the B matrix. Thus, job quantum 1 may be submitted to the add operation independent of the other job quantum.

Continuing with the present example, the add operation may be independently executing on 4 separate PEs within an MPE. Also, each add operation is non-threaded, and each non-threaded add operation receives a job quantum for execution, and further executes in parallel with the others. In this way, a single-threaded operation appears to be threaded to a calling program, and operational throughput is substantially improved.

Figure 2:
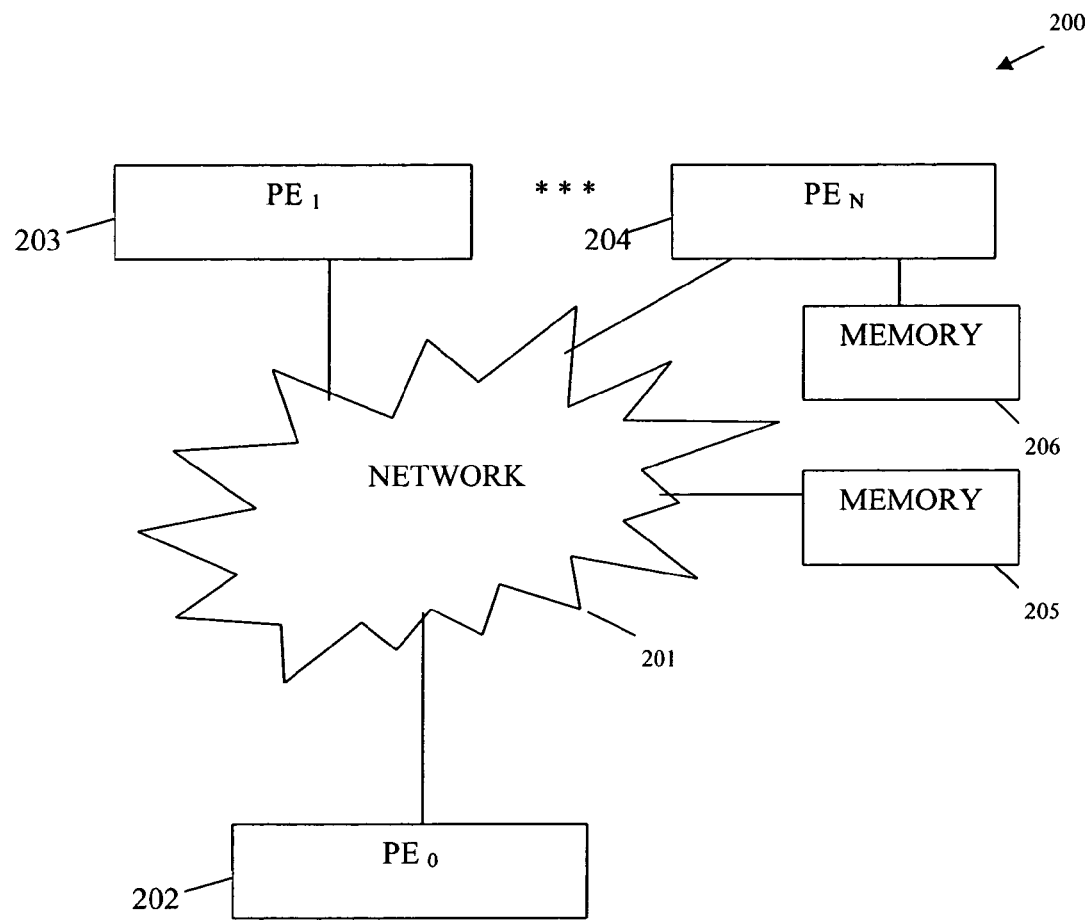
FIG. 2 shows a diagram of a hardware embodiment of the present invention.

FIG. 2 shows a diagram of an MPE 200 hardware embodiment of the present invention. Network 201 connects a plurality of PEs (e.g., 202-204). In various embodiments, MPE 200 includes any networked computing environment including multiple PEs, wireless PEs, peer-to-peer PEs, PEs connected via the Internet, PEs directly connected to one another, PEs connected by Plain Old Telephone Lines (POTS), and others. Moreover, a PE is not limited to a standard computing device, but in some embodiments, also includes, any intelligent appliances, any intelligent processing devices, digital phones, hand held GPS devices, wireless devices, and others. Further, a memory (205 or 206) is operatively coupled to the PEs (202-204) and/or the network 201.

$PE_0$ 202 includes a software program executing thereon, which initially receives a call for operation. One or more PEs (e.g., $PE_1$ 203 through $PE_{N-1}$ 204) also include a copy of the software program executing thereon. Although, as one skilled in the art will readily appreciate, the copies of the software program need not be entirely identical, since each PE may be residing in a different environment having a different OS, and the like. Correspondingly, it is not necessary for each PE to have identical copies of the software program.

Figure 3:
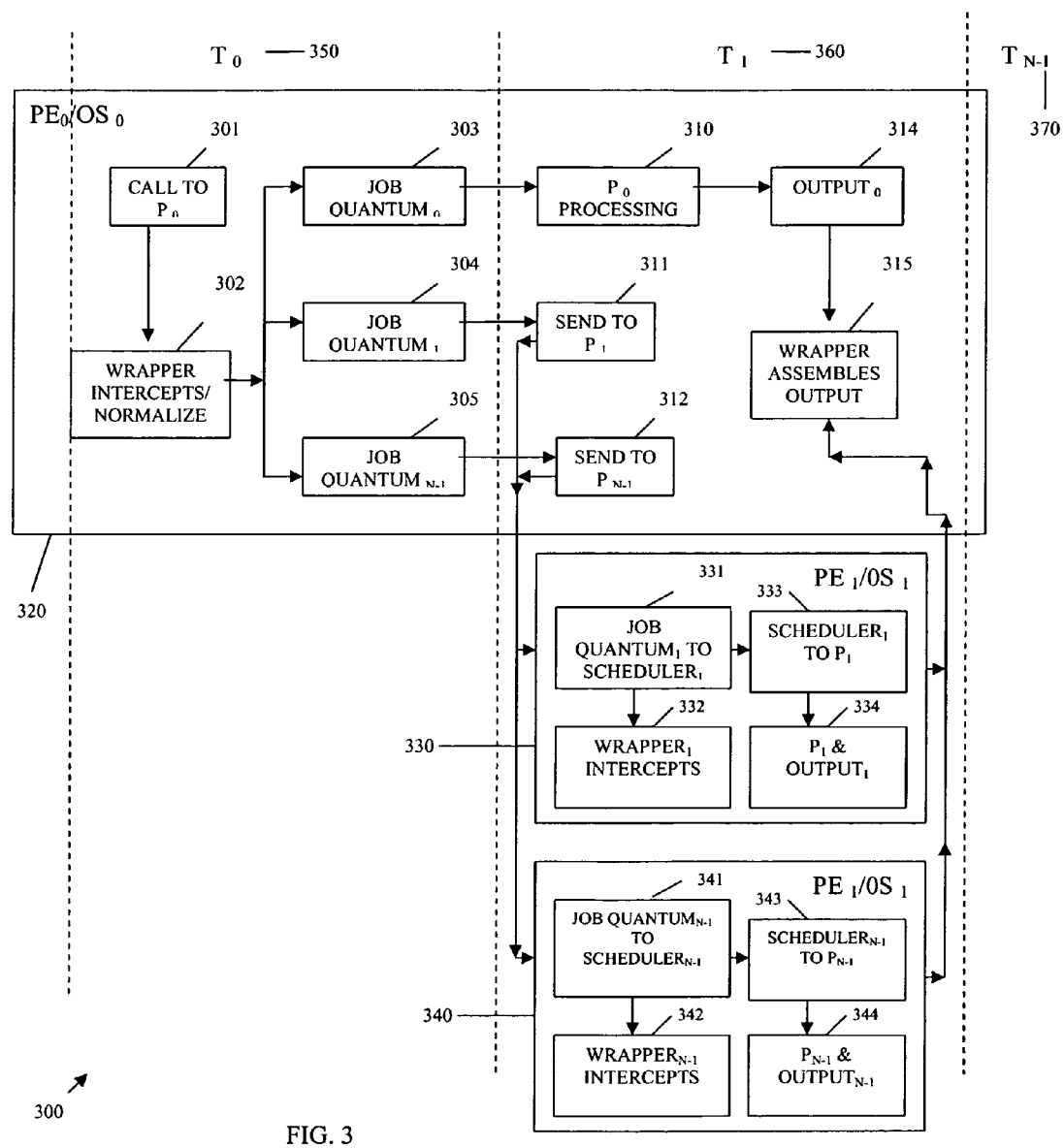
FIG. 3 shows a schematic diagram of an apparatus for subdividing and executing the input data of a software program.

FIG. 3 shows a schematic diagram of one apparatus 300 for subdividing and executing the input data of a software program. The apparatus 300 includes an initiating program $P_0$ residing on a $PE_0$ 320 having an OS environment $OS_0$.

Further, apparatus 300 includes one or more processing programs $P_1$ and $P_{N-1}$, each residing on a different PE and OS (e.g. $PE_1/OS_1$ 330 and $PE_{N-1}/OS_{N-1}$, respectively) environment from that of $PE_0$ 320. Moreover, a wrapper resides in $PE_0/OS_0$ 320 with an optional copy of the wrapper residing on $PE_1/OS_1$ 330 and $PE_{N-1}/OS_{N-1}$ 340.

Initially, at time $t_0$ 350 a call to $P_0$ is received in step 301, the wrapper in block 302 intercepts this call. The wrapper is a set of executable instructions that need not be a single software program, since as will be apparent to one skilled in the art, several independent software programs may logically and cooperatively form the wrapper. Furthermore, the wrapper includes knowledge about the input and output data received by $P_0$. In this way, the wrapper may be developed such that input data provided on a call to $P_0$, in step 301, may be parsed and normalized into individual job quanta (e.g., 303-305).

Job quantum$_0$ in block 303 is submitted to $P_0$ for processing in step 300 at time $t_1$ 330. Concurrently, job quantum$_1$ in block 304 is sent to processing program $P_1$ in step 311 and job quantum$_{N-1}$ in block 305 is sent to processing program $P_{N-1}$ in step 312. As previously presented, $P_1$ and $P_{N-1}$ are substantially identical to $P_0$ but need not be identical, since minor configuration, versioning, or other differences may exist between each installed program on the PEs.

Substantially in parallel to the execution of $P_0$ in step 300, job quantum$_1$ is being processed by $P_1$ on $PE_1$ 330 and job quantum$_{N-1}$ is being processed by $P_{N-1}$ on $PE_{N-1}$. Of course the processing load of each PE may dictate the exact time of execution, but each PE process the job quantum substantially in time period $t_1$ 360. Further, in some embodiments, each PE includes a job scheduler program designed to control the load balancing on the PE and the load associated with individual program execution on the PE. In this way, and optionally, the call sent to $P_1$ with job quantum$_1$ may be passed to scheduler$_1$ in step 331, and the call sent to $P_{N-1}$ with job quantum$_{N-1}$ may be passed to scheduler$_{N-1}$.

Alternatively, $P_1$ may also have a wrapper, which intercepts calls to $P_1$ in step 332, and $P_{N-1}$ may have a wrapper, which intercepts calls to $P_{N-1}$ in step 342. If a scheduler exists on the PEs then the job quantum$_1$ and $P_1$ are appropriately passed and executed in step 333 and the job quantum$_{N-1}$ and $P_{N-1}$ are appropriately passed and executed in step 343.

Once $P_1$ and $P_{N-1}$ are executed in steps 334 and 344, respectively, output$_1$ and output$_{N-1}$, generated by $P_1$ and $P_{N-1}$, are produced and returned to the wrapper residing on $PE_0$ 320 in step 315, where the output from $P_0$ processing in step 314 is also received. The output is then assembled into a single output for presentation. And, at time $T_{N-1}$ 370 processing ends normally, resulting in the parallel processing on multiple operations from a single, originally non-threaded, program.

As previously discussed, the software programs of the present invention need not be threaded to benefit from the parallel processing which is presented herein. Further, computationally expensive operations (e.g., bioinformatic calculations, structural dynamic calculations, and the like) experience substantial increases in throughput of operation with the present invention, since legacy non-threaded programs transparently appear to be threaded and execute substantially in parallel.

Figure 4:
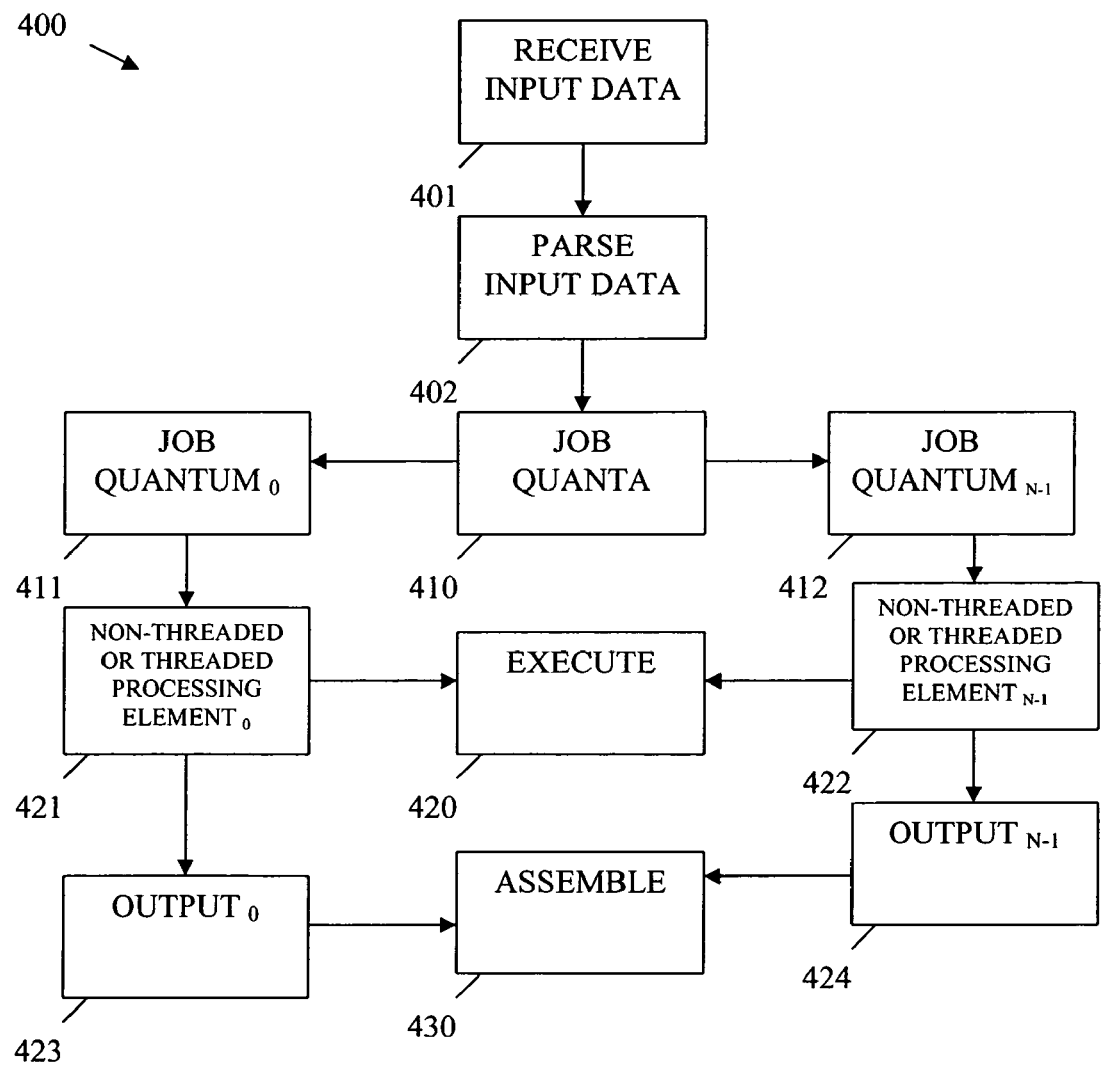
FIG. 4 shows a flow diagram for a method of processing a non-threaded set of executable instructions.

FIG. 4 shows a flow diagram of one method 400 for processing a non-threaded or singly threaded set of executable instructions. Input data is received in step 401, as previously presented, the data is input parameter data associated with a non-threaded/threaded computationally expensive software program such as, and by way of example only, a software program designed to perform pattern matching on protein or DNA sequences, a program designed to search for similar protein or DNA sequences in exiting distributed data stores, and the like.

The input data may include values associated with an input or may include a reference to obtain the values associated with the input. In this way, file names, variable substitutions, and other parameters may be used as input data. The input data is then parsed in step 402 producing job quanta in step 410. Parsing techniques are well known to those skilled in the art, and any consistent delineation to distinguish the separate input parameter data, will permit parsing with the present invention. Further, positional order within the input day may be used to provide or guide effective and consistent delineation.

For example, consider a wrapping set of executable instructions developed as a PERL script, wherein a call is made to a protein/DNA searching software program. The input data may appear as follows: "s,f1,f2,f3" where "s" indicates a search operation is to be performed and "f1,f2, f3" represent file names which are references to files having values containing protein or DNA sequences. In this example, the first positional character string, namely "s" represents the operation to be performed, and it is reliably delineated by a comma. The PERL script may readily be designed by those skilled in the art, to scan and parse the entire input data into individual job quantum 411 and 412 with the present invention.

A job quantum includes a discrete packet of input data that is operable to be provided to the software program for execution independent of any of any other job quantum. In the present example, three independent job quantum are produced and may appear as follows:

Job Quantum 1="s,f1";
Job Quantum 2="s,f2"; and
Job Quantum 3="s,f3".

As is readily apparent, each file name may be independently sent to the protein/DNA-searching program. Moreover, the searching program may be replicated or mirrored on one or more additional PEs within an MPE. Each individual program standing alone, or in combination with one another, need not be a threaded program. Further, each program has permission within the MPE to access the file references, in order to obtain the relevant protein/DNA sequence being searched. Alternatively, the PERL script may be operable to acquire the contents of the individual files and include them directly within the individual job quanta.

Once the job quanta are divided into independent job quantum, each quantum may be submitted for execution to a single PE executing the searching program. As will be readily apparent, the PERL script in the present example may include an internal memory accessed by variable references, wherein information regarding each available PE is managed.

This information may include, for example, PE reference number, submitted flag, status flag, error flag, error string, output flag, output string, number of job quanta, job quantum number submitted, and/or other parameters. The information may be maintained using any widely known data structure such as a linked list, a binary tree, a hash table, an object-oriented defined structure, and/or other data structures. In this way, job quanta are individually submitted to the software program (e.g., steps 421 and 422) and the PERL script manages the execution with minimal logic required.

Of course, as will be apparent to those skilled in the art, the information may be managed and stored on non-volatile storage as well without departing from the present invention.

Further, the individual replications of the software program may execute substantially in parallel on the individual PEs, as depicted in step 420. As previously presented, the software replicas need not be identical to one another since environmental variations may exist and each PE may have different OS environments. Also, depending upon the job queues and load associated with each individual PE, the individual job quanta need not be executed by the individual software programs in exact parallel.

As is readily appreciated by those skilled in the art, an initial calling application or end user desiring access to a single computationally expensive software program, may experience substantial increased throughput in responsiveness from the software program with the present invention, since transparently the individual operations of the software program are executing in parallel.

As each software program completes, output data may be produced (e.g., steps 423 and 424). The output data returns to the initial submitting PERL script of the present example, where it is assembled in step 430 for presentation to the initial calling application program. This is readily achieved, since the PERL script knows the order of the submitted input parameter data when the parameter data was initially parsed, maintenance of the information is readily achieved with the output order reconstructed upon assembly of the output data from each of the executions into a single output data. Moreover, since the PERL scripts intercepts or encapsulates the initial called software program, it is capable of directly providing the output presentation data or results data to the initial calling application.

Figure 5:
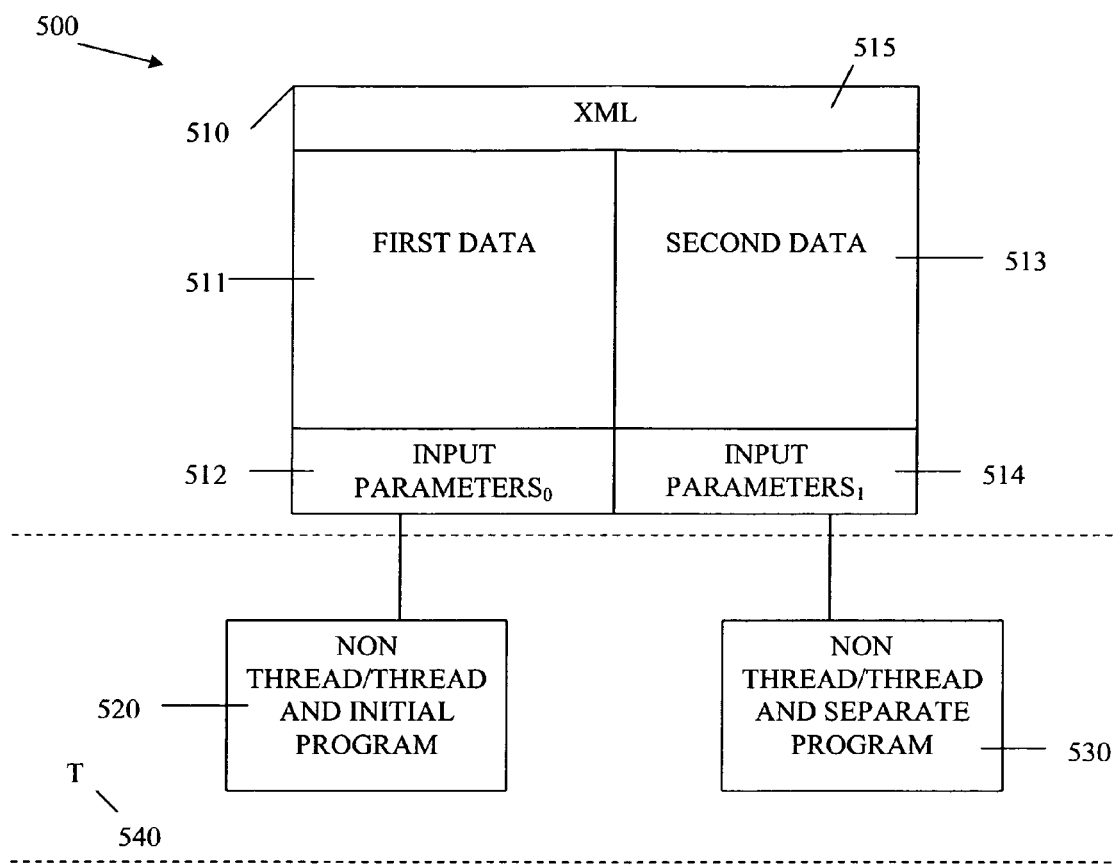
FIG. 5 shows a schematic diagram of a job quanta data structure.

FIG. 5 shows one schematic diagram 500 of a job quanta data structure 500 of the present invention. As previously presented, job quanta data 510 include a first data subset 511 and a second data subset 513, wherein the first and second data subsets are programmatically capable of being delineated from one another for later independent submission to separate non-threaded/threaded programs (e.g., 520 and 530). Further, the first data 511 is assembled into input parameter data 512, and the second data 513 is assembled into input parameter data 514. Each input parameter data passed to the non-threaded/threaded programs.

The first data 511 is assembled into input parameters$_0$ 512 and submitted to a non-threaded/threaded and initial program 520 at time t 540. Concurrently, and substantially at time t 540, the second data is assembled into input parameters$_1$ 514 and submitted to a non-threaded/threaded and separate program 530. Each program resides on a separate PE 202, 203 or 204 in an MPE 200.

Further, the delineation of the first data 511 and the second data 513 may occur using any reliable positional or marked-up syntax such as, for example, extensible markup language (XML) 515, wherein the markup associated with content of the data is divorced from a markup associated with the presentation of the data. In this way, the job quanta 510 are portable and operable to be interfaced with a plurality of disparate software applications, in a manner similar to MPI.

Figure 6:
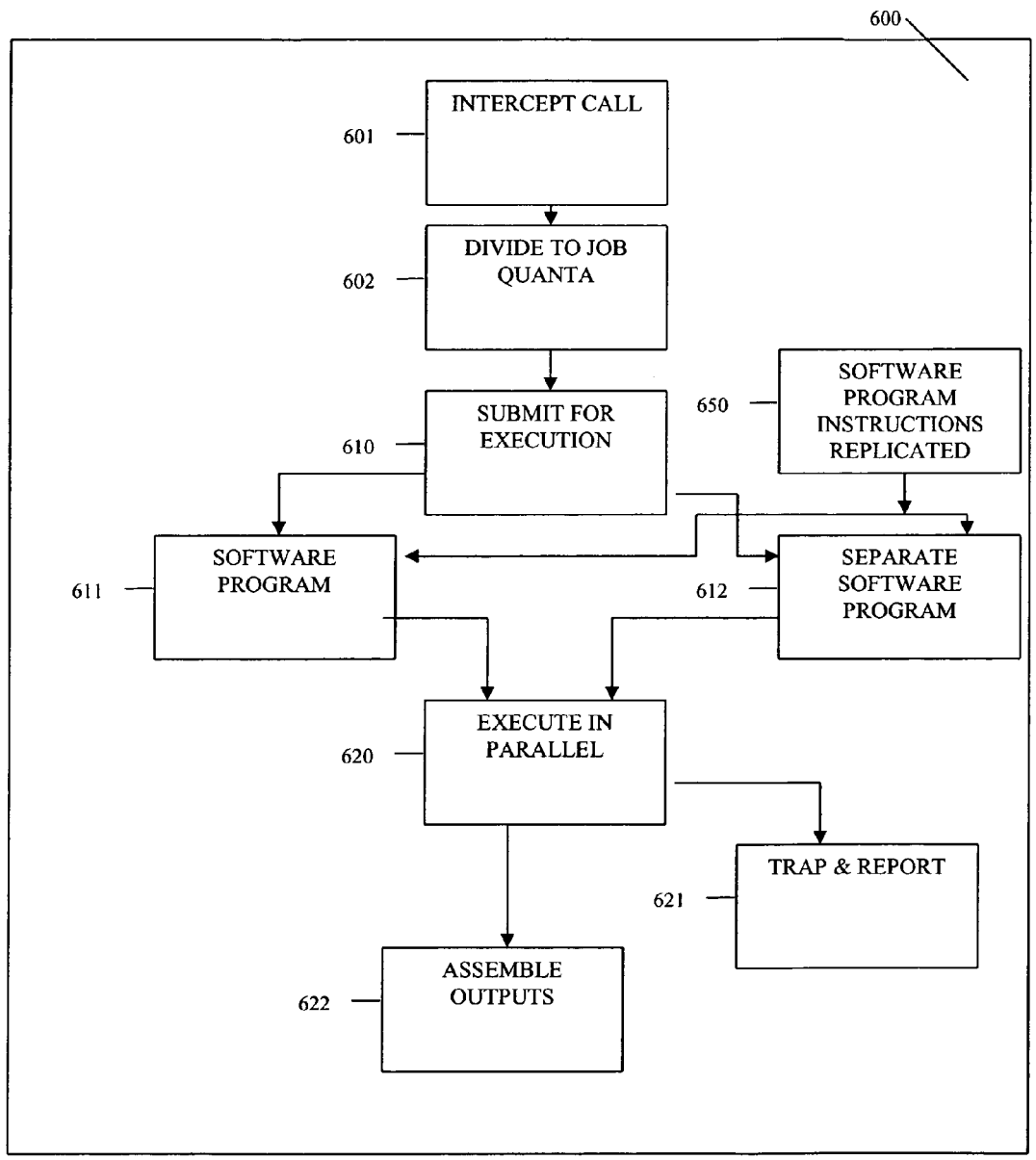
FIG. 6 shows a schematic diagram of a system for performing parallel processing.

FIG. 6 shows one schematic diagram for a system 600 for performing parallel processing with the present invention. Initially, a call to a software program is made and intercepted by system 600 in step 601. Interception of the call to the software program may easily be achieved by those skilled in the art, for example if the software program is executed by referencing the name "x", an intercepting script is written and called "y", references to x are then be aliased such that when x is referenced, y is actually referenced. Y then has permission to execute x directly, by reference to x in a protected environment, wherein x is unaliased during the context of y's execution. Of course, many other techniques may be readily deployed to intercept references made to a software program, all of which would be readily apparent to those skilled in the art and intended to fall within the scope of the present invention. Moreover, the software program itself may be altered to include the intercepting instructions, such that a separate application need not exist at all.

Next, system 600 divides the input data into job quanta in step 602. As previously presented, in some embodiments, scanning and parsing of the input data provided on an initial call to a software program are used to divide the input data into a normalized format, which are then bundled as individual job quanta and submitted for execution in step 610. The software program 650 is substantially replicated to one or more additional PEs in the MPE, each job quantum submitted to a separate PE having a program replica (e.g., steps 611-612). In this way, the executions of each job quantum occur substantially in parallel in step 620.

During execution, errors and statistics regarding the operation of each of the individual programs, in some embodiments, are trapped and reported in step 621. This is readily achieved by maintaining and querying status flags associated with the execution of the program, and by establishing event driven logic to permit rapid recovery and debugging of the program should errors or failures occur.

Finally upon the completion of the executions, the output data associated with each execution is assembled in step 622 into a single presentation, output, or results data and provided to the original calling program, which was intercepted in step 601.

CONCLUSION

The present invention provides for parallel processing 102 of job quanta 101 in an MPE 201, wherein each job quantum executes on a separate PE 202-204 and is submitted to replicas of a single software program that resides on each PE 202-204. Upon completion of the executions, output data 103 is assembled and provided as a single presentation or results data.

One aspect of the present invention provides an apparatus 300 for subdividing the input data associated with a software program and executing each subdivided input data subset on one or more processing elements (320, 330, and 340). The apparatus includes an initiating program $P_0$, one or more processing programs ($P_1$ and $P_{N-1}$), and a wrapper. The wrapper intercepts and normalizes a call (301) to the initiating program $P_0$ in step 301, and is further operable to subdivide input parameters into one or more job quanta (303-305), with each job quantum being submitted for execution to a separate processing program (310-312), residing on separate processing elements (320, 330, and 340).

Optionally, the separate processing elements (330 and 340) include job schedulers that are operable to receive the initial request to access the processing programs (steps 331 and 341). Each scheduler manages the execution of the processing program executing on the appropriate processing element (e.g., 330 or 340). Further, each separate processing element (330 and 340) includes a wrapper operable to intercept the job quantum (332 and 342) submitted to the processing program residing on the appropriate processing element (e.g., 330 or 340). The schedulers may then call the processing programs in 333 and 343, where execution occurs and output is generated in 334 and 344.

Outputs from the processing programs ($P_0$, $P_1$, and $P_{N-1}$) are then sent to the wrapper residing on the initial processing element $PE_0$ 320, where any output (314) from the initiating program $P_0$ is also received. The wrapper assembles the outputs in step 315 to form a single results data.

In some embodiments, the operations of the processing programs ($P_0$, $P_1$, and $P_{N-1}$) occur substantially in parallel at time $t_1$ 360. Moreover, the operations are substantially identical and, in some embodiments, include bioinformatic calculations. The processing programs ($P_0$, $P_1$, and $P_{N-1}$) are non-threaded and, in some embodiments, at least one of the processing elements ($PE_1$ 330, or $PE_{N-1}$ 340) resides in a disparate processing environment ($PE_0$ 320) from the initiating program $P_0$.

In another aspect of the present invention, a method 400 of processing a first non-threaded set of executable instructions is provided. The instructions comprising receiving input data associated with a call to the first non-threaded set of executable instructions in step 401. The input data is parsed in step 402 into a plurality of job quanta in step 410, with each job quantum (steps 411-412) operable to be independently processed by the first non-threaded set of executable instructions (step 421). Further, at least one job quantum is submitted for execution to a second non-threaded set of executable instructions (step 422). The second non-threaded set of executable instructions resides on one or more different processing elements from the first non-threaded set of executable instructions.

Moreover, at least one job quantum is submitted for an execution to the non-threaded set of executable instructions. The executions occur substantially in parallel in 420. Furthermore, the method 400 assembles (step 430) an output data associated with the results of execution of the second non-threaded set of executable instructions (424) for a presentation. Output from the execution of the non-threaded set of executable instructions in 423 may also be assembled in step 430.

In yet another aspect of the present invention, a job quanta data structure 510 is provided having first data 511 and second 513 data, wherein the first 511 and second 513 data are operable to be delineated and independently submitted as input parameter data (512 and 514) and used for execution by separate non-threaded sets of executable instructions and further processed substantially in parallel (e.g., time t 540).

The first 511 and second 513 data may be delineated using XML. And, the first 511 and second 513 data may be initially submitted to a single non-threaded set of executable instructions, before being delineated and separately submitted to separate non-threaded sets of executable instructions.

In still another aspect of the present invention, a system 600 for performing parallel processing on a call to execute a software program is provided, comprising an apparatus for intercepting a call to a software program in step 601. Further, an apparatus for dividing the input data into a plurality of job quanta is provided in step 602, and an apparatus for submitting at least one job quantum to the software program and for submitting at least one different job quantum to a separate software program is provided in steps 610-612. Finally, an apparatus for executing the software program and at least one of the separate software programs substantially in parallel is provided in step 620.

Optionally, an apparatus for assembling output data associated with the execution of the software program and at least one of the separate software programs into a presentation data is provided. Still further, and optionally, an apparatus for trapping and reporting error conditions generated by the execution of the software program and at least one of the separate software programs is provided.

In yet another aspect of the present invention, a method 400 for processing a software program is provided wherein input data associated with a call to the software program is received in block 401. The input data is parsed in block 402 into a plurality of job quanta in block 410, each job quantum (411 and 412) operable to be independently processed by the software program. Next, at least one job quantum is submitted for execution to a replica software program in block 422 which is substantially identical to the software program, wherein the replica software program resides on one or more different processing elements from the software program.

In still another aspect of the present invention, an information handling system 200 is provided including a network 201, a plurality of PEs 202-204 memory (205 or 206) operatively coupled to the PEs 202-204 or the network 201, and an apparatus for wrapping a call to an application program to divide input data among the PEs for execution according to the application program and recombining output data from the PEs.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. An apparatus, implemented in a computer-readable medium, for subdividing input data associated with a software program and processing each subdivided input data on one or more processing elements, comprising:
   a non-threaded initiating program;
   one or more non-threaded processing programs, wherein each of the one or more non-threaded processing programs are substantially identical and perform the same functions or operations as remaining ones of the one or more non-threaded processing programs, wherein substantially identical indicates that minor configuration differences exists; and
   a wrapper that intercepts a call that is made to the initiating program, wherein the wrapper is operable to subdivide input parameters into one or more job quanta, wherein each job quantum is submitted for execution to a separate processing program selected from the one or more processing programs residing on a separate processing element and wherein at least one job quantum is submitted for execution to the initiating program.

2. The apparatus of claim 1, wherein the wrapper assembles one or more output data from each processing program to form a single results data.

3. The apparatus of claim 1, wherein each job quantum is provided to a separate job scheduler residing on each of the processing elements, each scheduler manages the execution of the processing program executing on the processing element.

4. The apparatus of claim 1, further comprising:
   one or more additional wrappers, each additional wrapper residing on a single processing element and is operable to intercept the job quantum submitted to the processing program residing on the processing element.

5. The apparatus of claim 1, wherein the initiating program and each of the processing programs perform one or more operations that are identical.

6. The apparatus of claim 5, wherein the operations are bioinformatic calculations.

7. The apparatus of claim 1, wherein at least one of the processing elements resides in a disparate processing environment from the initiating program.

8. The apparatus of claim 1, wherein the input parameters are normalized prior to being subdivided into the job quanta.

9. A method of processing a non-threaded set of executable instructions, comprising:
   receiving input data associated with a call that was made to a first non-threaded set of executable instructions;
   parsing the input data into a plurality of job quanta, each job quantum operable to be independently processed by the first non-threaded set of executable instructions; and
   submitting at least one job quantum for execution to a second non-threaded set of executable instructions, wherein the second non-threaded set of executable instructions is substantially identical to the first non-threaded set of executable instructions and performs the same functions as the first non-threaded set of executable instructions, wherein the second set of executable instructions resides on one or more different processing elements from the first non-threaded set of executable instructions, and wherein substantially identical indicates that minor configuration differences exists.

10. The method of claim 9, further comprising:
    assembling an output data associated with the results of the execution of the second non-threaded set of executable instructions for a presentation.

11. The method of claim 9, further comprising:
    submitting at least one job quantum for execution to the first non-threaded set of executable instructions.

12. The method of claim 11, wherein the executions occur in parallel.

13. A computer-readable medium having instructions embodied on a computer, the instructions when executed by the computer perform processing to:
    separate a first data and second data from one another, wherein the first and second data are to be delineated and independently used as input parameter data, and wherein the first and second data are originally acquired as part of a call that was made to a particular non-threaded set of executable instructions and the call is intercepted before received by the particular non-threaded set of executable instructions to acquire the first and second data; and
    submit each input parameter data to separate non-threaded sets of executable instructions and to be processed in parallel on different processing elements, wherein each separate non-threaded set of executable instructions is substantially identical and performs the same functions as remaining ones of the non-threaded sets of executable instructions, wherein substantially identical indicates that minor configuration differences exists.

14. The medium of claim 13 further including instructions to delineate the first and second data using extensible markup language.

15. The medium of claim 13 further including instructions to initially submit the first and second data as input param eter data to a single non-threaded set of executable instructions.

16. A system, implemented in a computer-readable medium, for performing parallel processing on a call to execute a software program, comprising:
 means for intercepting a call to the software program, which is non-treaded, wherein the call is made and directed to the software program and is intercepted before received and processed by the software program;
 means for dividing a set of input data into a plurality of job quanta including a first job quantum and a second job quantum;
 means for submitting the first job quantum to the software program and for submitting the second job quantum to a separate software program, wherein the software program and the separate software program are substantially identical to one another and perform the same functions as one another, wherein substantially identical indicates that minor configuration differences exists; and
 means for executing the software program and the separate software programs substantially in parallel.

17. The system of claim 16, further comprising:
 means for assembling output data associated with the execution of the software program and at least one of the separate software programs into a presentation data.

18. The system of claim 17, further comprising:
 means for trapping and reporting error conditions generated by the execution of the software program and at least one of the separate software programs.

19. A method of processing a software program, comprising:
 receiving input data associated with a call to the software program, which is non-threaded;
 parsing the input data into a plurality of job quanta, each job quantum operable to be independently processed by the software program; and
 submitting at least one job quantum for execution to a replica software program that is substantially identical to the software program and which performs the same functions as the software program, wherein the replica software program resides on one or more different processing elements from the software program, and wherein substantially identical indicates that minor configuration differences exists.

20. An information handling system, comprising:
 a network;
 a plurality of processing elements;
 memory operatively coupled to the processing elements; and
 means for intercepting a call that was made to a non-threaded application program by dividing input data associated with the intercepted call among the processing elements for execution and recombining output data from the processing elements, wherein each processing element includes a duplicate instance of a same non-threaded application and wherein duplicate instances of the same non-threaded application receive a different portion of the divided input data.

21. A method of processing a set of executable instructions, comprising:
 receiving input data associated with a call that was made directly to the set of executable instructions, which are non-threaded and which is intercepted before the set of executable instructions can process the call;
 separating the input data into a plurality of job quanta, wherein each job quantum is operable to be independently processed by the set of executable instructions; and
 submitting at least one job quantum for execution to a substantial copy of the set of executable instructions, wherein the substantial copy performs the same functions as the set of executable instructions, and submitting a different job quantum for execution to the set of executable instructions, wherein the substantial copy of the set of executable instructions and the set of executable instructions reside on different processing elements, and wherein a substantial copy indicates that minor configuration differences exists between copies.

22. The method of claim 21, further comprising assembling output data from the execution of the substantial copy of the set of executable instructions and from the set of executable instructions into a single presentation data.

23. The method of claim 21, further comprising executing the substantial copy of the set of executable instructions and the set of executable instructions substantially in parallel.

24. The method of claim 21, wherein in separating the input data, the input data is separated into the plurality of job quanta by a wrapper associated with the set of executable instructions.

25. A parallel processing system, implemented in a computer-readable medium, comprising:
 a first software program having a wrapper operable to intercept calls made to the first software program, wherein the first software program resides on one or more first processing elements and is non-threaded, and wherein the wrapper is to intercept the calls before the software program can process the calls and wherein the wrapper is independent of the first software program; and
 a second software program which is a substantial copy of the first software program, which performs the same functions as the first software program, and which is non-threaded, wherein the second software program resides on one or more second processing elements, and wherein the substantial copy indicates that minor configuration differences exists, and
 wherein the wrapper intercepts the calls that are made to the first software program and parses input data associated with the calls into job quanta, the job quanta includes a first job quantum and a second job quantum, and the first job quantum is submitted to the first software program for processing and the second job quantum is submitted to the second software program for processing in parallel.

26. The system of claim 25, wherein the wrapper assembles output results associated with the processing of the first job quantum and the second job quantum.

27. The system of claim 25, wherein one or more of the first processing elements are different from one or more of the second processing elements.

28. A parallel processing system, comprising:
 a wrapper that intercepts calls that are directly made to non-threaded software programs, wherein the software programs are substantial copies of each other and performs the same functions as each other and which reside on different processing elements, and wherein the wrapper separates input data associated with the calls into a plurality of independent job quanta, and wherein the substantial copies indicates that minor configuration differences exists between copies; and a scheduler that receives the plurality of job quanta from the wrapper and submits substantially in parallel different job quantum associated with the job quanta to a number of the software programs for processing, wherein the scheduler selects the number of the software programs based on processing loads associated with the number of the software programs.

29. The system of claim 28, wherein the wrapper assembles results associated with processing the different job quantum for a unified presentation.

30. The system of claim 28, wherein the scheduler traps any errors associated with processing the different job quantum and reports the errors to the wrapper.

* * * * *

UNITED STATES PATENT AND TRADEMARK OFFICE
CERTIFICATE OF CORRECTION

PATENT NO. : 7,249,357 B2
APPLICATION NO. : 09/934443
DATED : July 24, 2007
INVENTOR(S) : Landman et al.

Page 1 of 1

It is certified that error appears in the above-identified patent and that said Letters Patent is hereby corrected as shown below:

On the Title page, item (56), under "Other Publications", in column 2, line 1, delete "dixtributed.net" and insert -- distributed.net --, therefor.

On the Title page, item (56), under "Other Publications", in column 2, line 6, delete "Bristo" and insert -- Bristol --, therefor.

On page 2, item (56), under "Other Publications", in column 1, line 2, delete "envolved" and insert -- evolved --, therefor.

On page 2, item (56), under "Other Publications", in column 2, line 7, delete "Incytel" and insert -- Incyte --, therefor.

On page 2, item (56), under "Other Publications", in column 2, line 7, delete "Meyrs" and insert -- Myers --, therefor.

In column 13, line 7, in Claim 16, delete "non-treaded" and insert -- non-threaded --, therefor.

Signed and Sealed this

Eighteenth Day of September, 2007

JON W. DUDAS
*Director of the United States Patent and Trademark Office*